US011243912B2

(12) United States Patent
Sorvillo et al.

(10) Patent No.: US 11,243,912 B2
(45) Date of Patent: *Feb. 8, 2022

(54) CONTEXT-BASED FILE SELECTION (71) Applicant: GOOGLE LLC, Mountain View, CA (US)

(72) Inventors: Michael Sorvillo, New York, NY (US); Mandy Richau Sladden, Lafayette, CO (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/807,891

(22) Filed: Nov. 9, 2017

(65) Prior Publication Data

US 2018/0067959 A1 Mar. 8, 2018

Related U.S. Application Data (63) Continuation of application No. 14/010,850, filed on Aug. 27, 2013, now Pat. No. 9,842,113.

(51) Int. Cl.
G06F 16/14 (2019.01)

(52) U.S. Cl.
CPC .......... *G06F 16/156* (2019.01); *G06F 16/14* (2019.01)

(58) Field of Classification Search
None
See application file for complete search history.

(56) References Cited

U.S. PATENT DOCUMENTS

| | | | |
|---|---|---|---|
| 2003/0158855 A1* | 8/2003 | Farnham | G06F 3/0481 |
| 2004/0119761 A1* | 6/2004 | Grossman | G06Q 10/10 715/854 |
| 2006/0035632 A1* | 2/2006 | Sorvari | H04M 1/271 455/418 |
| 2009/0030872 A1* | 1/2009 | Brezina | H04M 15/00 |
| 2010/0180200 A1* | 7/2010 | Donneau-Golencer | G06Q 10/10 715/705 |
| 2011/0043652 A1* | 2/2011 | King | G06F 17/2211 348/222.1 |
| 2011/0225192 A1* | 9/2011 | Imig | G06F 17/30646 707/775 |
| 2012/0095979 A1* | 4/2012 | Aftab | G06F 17/30867 707/706 |
| 2012/0191777 A1* | 7/2012 | Iwasaki | G06Q 10/10 709/204 |
| 2013/0007198 A1* | 1/2013 | Gupta | H04N 21/25808 709/217 |

(Continued)

Primary Examiner — Aleksandr Kerzhner
Assistant Examiner — Eddy Cheung
(74) Attorney, Agent, or Firm — Lowenstein Sandler LLP (57) ABSTRACT A method that includes responsive to a request to access a file stored in a memory of a computing device, identifying a context in which the access to the file is being requested; identifying one or more computer files that at least partially match the context; generating, for a display, a list of stored files selectable by a user, the list of stored files including the identified one or more computer files at least partially matching the context; and generating, for the display, a list of user contacts selectable by the user, the list of user contacts including one or more user contacts identified as having communicated the user that include the identified one or more computer files at least partially matching the context.

20 Claims, 8 Drawing Sheets (56) References Cited

U.S. PATENT DOCUMENTS

| | | | | |
|---|---|---|---|---|
| 2014/0053228 | A1* | 2/2014 | Mahadevan | G06F 17/30165 |
| | | | | 726/1 |
| 2015/0012805 | A1* | 1/2015 | Bleiweiss | G06F 17/2235 |
| | | | | 715/205 |
| 2015/0304369 | A1* | 10/2015 | Sandholm | G06Q 10/10 |
| | | | | 715/753 |

* cited by examiner

DONE | ↶ ↷ FONTS B I U ✏ □ ☰ ☰ ☷ ☰ ☰

GREECE TRIP 2013 — 602
JULY 7 TO JULY 14 — 604

CONTEXT-BASED FILE SELECTION

CROSS REFERENCE TO RELATED APPLICATION

The present application is a continuation of U.S. patent application Ser. No. 14/010,850, filed on Aug. 27, 2013, and is herein incorporated by reference in its entirety.

TECHNICAL FIELD

This disclosure relates in general to accessing files using context-based file selection.

BACKGROUND

Computing devices can be employed by a user to create and manage documents such as text files, spreadsheets, pictures, videos, presentations, e-mail messages, web pages, etc. As computing devices and associated networks become more capable and complex and storage options become more extensive, finding and selecting a particular document can be difficult.

SUMMARY

This disclosure relates generally to systems, methods and apparatuses that may be used to more quickly access files by relying on context-based file selection.

An aspect of the disclosed embodiments is a method that includes: responsive to a request to access a file stored in a memory of a computing device, identifying, by a processor, a context in which the access to the file is being requested; identifying, by the processor, one or more computer files that at least partially match the context; generating, by the processor, for a display, a list of stored files selectable by a user, the list of stored files including the identified one or more computer files at least partially matching the context; and generating, by the processor, for the display, a list of user contacts selectable by the user, the list of user contacts including one or more user contacts identified as having communicated the user that include the identified one or more computer files at least partially matching the context, wherein each of the user contacts in the list of user contacts includes a link to the identified one or more computer files at least partially matching the context that are included in communications between a respective user contact and the user.

Another aspect of the disclosed embodiments is a computing device that includes a memory and a processor to execute instructions stored in the memory to: responsive to a request to access a file stored in a memory of a computing device, identify a context in which the access to the file is being requested; identify one or more computer files that at least partially match the context; generate, for a display, a list of stored files selectable by a user, the list of stored files including the identified one or more computer files at least partially matching the context; and generate, for the display, a list of user contacts selectable by the user, the list of user contacts including one or more user contacts identified as having communicated the user that include the identified one or more computer files at least partially matching the context, wherein each of the user contacts in the list of user contacts includes a link to the identified one or more computer files at least partially matching the context that are included in communications between a respective user contact and the user.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

As computing devices and networks such as the Internet to which they are attached become larger and more capable, locating information can become a more difficult task. For example, trying to find a single computer file among thousands of files can be a time-consuming task. On many computing devices, the user is presented with an "open file" dialog box when a user desires to access a file. The open file dialog lists file names from either the last location accessed or a default location. In order to find a particular file, the user must navigate through a potentially large and complex file system to locate the file.

The file system to be navigated to locate a file can be enormous and contain many files, making quick access to a given file a very difficult and time-consuming task. Using a search function can assist in finding a particular file but can require that a separate application be run and the search results entered into the file open dialog. Further, the ability of a search engine to find a particular file can be a function of the quality of the search string formed by a user. To form a high quality search string, relevant information regarding the file must be remembered to make searching efficient.

One addition to a file open dialog to make file locating easier is the "recent" feature that organizes file names of recently accessed files in a separate list. Organizing file names in a "recent" list can make searching for a particular file easier if the file has been recently accessed. However, this list cannot help locate the file if the file has not been accessed recently, since "recent" lists are limited in the number of entries to make the list manageable. Another problem is that some recent lists include all files accessed recently, not just files relevant to the application or task currently be undertaken by the user, thereby making the likelihood that a desired file is listed in a recent list lower.

In contrast, and in accordance with the teachings herein, candidate files may be found by using the context associated with the request to open a file to help find the correct file. Aspects of disclosed implementations assist in accessing files on a computing device by taking into account the context within which a computer file is being accessed. Context can be defined as information regarding past and current activities occurring on a computer system. More precisely, context can be defined as information regarding past and current activities as related to current user activity. For example, the current activity can be running a particular application on a computing device and the context can include information regarding what files are accessed by the application and what other applications might be executing at the same time. Context may be stored in a context file that contains the information regarding past and current use of a computing device and how it is related to other activities. The terms "context" and "context file" will be used interchangeably herein.

Context information can be created by a software program that observes actions being performed on a computer and makes decisions regarding which actions can be included in the context file. A context software program can use the context information from the context file to suggest files to access or other actions based on current activities. For example, context information regarding a user's current and past interaction with a computing device can be used to search the file system, filter file names found and present to the user a list of file names belonging to files that have been determined to be relevant to the current activity occurring on the computing device. The presentation is responsive to a request to open a file or a request to attach a file to an email, etc. That is, for example, the current context may be compared to the stored context to find files in response to a request to access a file, such as to open a file or attach a file within an already open application. Herein, a user request for a file may be interchangeably referred to as a request to access a file, to search for a file, to select a file or to open a file.

Context information regarding a user's interaction with a computing device can be acquired in real time, as a user is interacting with the computing device. For example, one implementation may observe the text a user is entering into a document by typing and form context information while the document is being prepared for use in selecting candidate files for presentation to the user.

The presentation to the user may be a dialog with file identifiers including file names and/or thumbnails for files determined to be relevant to the context in which the file is requested. This can provide a high likelihood that at least one of the file names presented is a file name desired by the user at that particular time. Further, selecting a file name from the files names presented can be incorporated into the context associated with the file and thereby make the next file selection task produce an improved list of file names that can be even more relevant to the user.

Accessing a file on a computing device can require that the accessing device know more than simply the file name of the file to be opened. Accessing a file can require, for example, information regarding the location of the file and possibly passwords or other security information such as encryption keys. "File name" will be used herein as a shorthand descriptor for the information required in identifying, locating and accessing files with a computing device.

Information in addition to file names can be presented to a user as a result of analyzing the context associated with a user or computing device. For example, when composing an e-mail message, a context application can analyze the contents of the e-mail as it is being written and suggest possible recipients in addition to suggesting possible attachments to the e-mail. In another example, if dates and times are mentioned when composing an e-mail or other document, a context analysis application can analyze the contents of the document and extract information from a calendar program related to the dates and times. This information can be used to create a new appointment to be entered into the calendar or can be displayed for a user to prevent double booking appointments, for example.

Figure 1:
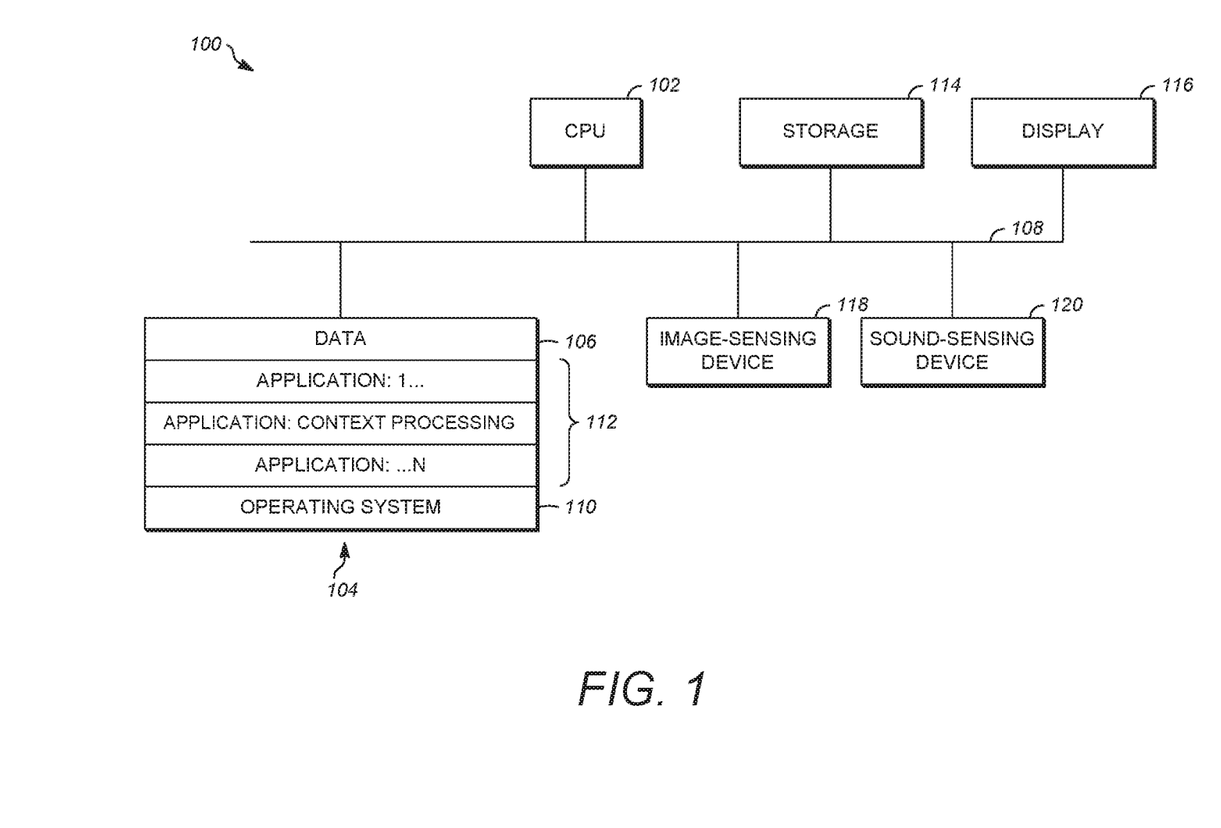
FIG. 1 is a block diagram of an exemplary computing device in which implementations of the teachings herein may be incorporated.

FIG. 1 is a block diagram of an exemplary computing device 100 in which implementations of the teachings herein may be incorporated. Computing device 100 can be in the form of a computing system including multiple computing devices, or in the form of a single computing device. For example, computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more elements of computing system 100 may be integrated into any number of separate physical units connected for interaction with each other either physically or wirelessly. This connection may be over a network, such as the Internet, a wired or wireless local area network (LAN), a cellular telephone network or any combination of these. In some implementations, certain components of computing system 100 may be omitted. In others, additional components may be included.

A CPU 102 in computing device 100 can be a conventional central processing unit. Alternatively, CPU 102 can be any other type of device, or multiple devices, capable of manipulating or processing information now-existing or hereafter developed. Although the disclosed implementations can be practiced with a single processor as shown, e.g., CPU 102, advantages in speed and efficiency may be achieved using more than one processor.

A memory 104 in computing device 100 can be a read only memory (ROM) device or a random access memory (RAM) device in an implementation. Any other suitable non-transitory type of storage device can be used as memory 104. Memory 104 can include code and data 106 that is accessed by CPU 102 using a bus 108. Memory 104 can further include an operating system 110 and application programs 112, the application programs 112 including at least one program that permits CPU 102 to perform methods described herein. For example, application programs 112 can include applications 1 through N, which further include an application for context processing that performs methods described here. Computing device 100 can also include a secondary storage 114 that can, for example, be a memory card used with computing device 100 when it is mobile. Images described herein may contain a significant amount of information, so they can be stored in whole or in part in secondary storage 114 and loaded into memory 104 as needed for processing.

Computing device 100 can also include one or more output devices, such as a display 116. Display 116 may be, in one example, a touch sensitive display that combines a display with a touch sensitive element that is operable to sense touch inputs. Display 116 can be coupled to CPU 102 via bus 108. Other input devices that permit a user to program or otherwise use computing device 100 can be provided in addition to or as an alternative to display 116, such as a keyboard or mouse. Display 116 can be implemented in various ways, including by a liquid crystal display (LCD), a cathode-ray tube (CRT) display or a light emitting diode (LED) display, such as an OLED display.

Computing device 100 can also include or be in communication with an image-sensing device 118, for example a camera, or any other image-sensing device 118 now existing or hereafter developed that can sense and capture an image such as the image of a user operating computing device 100. Image-sensing device 118 can be positioned such that it is directed toward or away from the user operating computing device 100. In an example, the position and optical axis of image-sensing device 118 can be configured such that the field of vision is directed away from display 116 and is able to produce an image visible on display 116.

Computing device 100 can also include or be in communication with a sound-sensing device 120, for example a microphone or any other sound-sensing device now existing or hereafter developed that can sense sounds near computing device 100. Sound-sensing device 120 can be positioned such that it is directed toward a user operating computing device 120 and can be configured to receive sounds, for example, speech or other utterances, made by the user while the user operates computing device 100.

Although FIG. 1 depicts CPU 102 and memory 104 of computing device 100 as being integrated into a single unit, other configurations can be utilized. The operations of CPU 102 can be distributed across multiple machines (each machine having one or more of processors) that can be coupled directly or across a local area or other network. Memory 104 can be distributed across multiple machines such as a network-based memory or memory in multiple machines performing the operations of computing device 100. Although depicted here as a single bus, bus 108 of computing device 100 can be composed of multiple buses. Further, secondary storage 114 can be directly coupled to the other components of computing device 100 or can be accessed via a network and can comprise a single integrated unit such as a memory card or multiple units such as multiple memory cards. Computing device 100 can thus be implemented in a wide variety of configurations.

Computing device 100 can be used to locate and open computer files stored anywhere on a computing device or a network to which the computing device is connected. Computing device 100 can also be used to create documents such as e-mail messages or other documents and store them locally and/or transmit them to other computing devices via a network. Aspects of disclosed implementations can observe one or more user's activities on a computing device, extract information from the observations according to rules and store the extracted information in memory. Other aspects can use the information in the memory to suggest file names, e-mail recipients or other information to a user when the user's current activities on the computing device suggest that information from the context file might be useful to the user.

Figure 2:
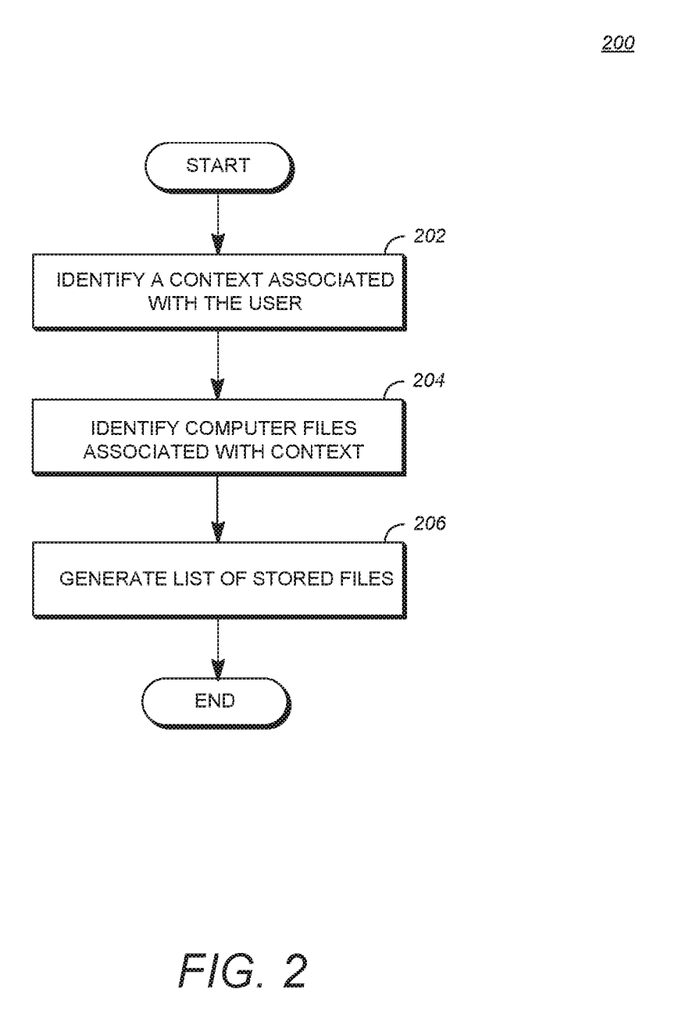
FIG. 2 is a flowchart of a process for creating a document according to an implementation of the teachings herein.

FIG. 2 is a flowchart of a process 200 for using context to assist a user in accessing a document according to an implementation of the teachings herein. Process, or method of operation, 200 can be implemented, for example, as a software program that is executed by computing devices such as computing device 100. The software program can include machine-readable instructions that are stored in a memory such as memory 104 that, when executed by a processor such as CPU 102, cause the computing device to perform process 200. Process 200 can also be implemented using hardware. As explained above, some computing devices may have multiple memories and multiple processors, and the steps of process 200 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 200 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

Process 200 may be implemented as an application (e.g., a mobile application) executing locally on a computing device of a user or may be executed on a remote computing device in communication with the computing device of a user to transmit commands from the computing device and receive information from the remote computing device, such as through a web browser, for example.

At step 202, responsive to a request to select a file stored in memory, such as a request to open a file or a request to attach a file to an email, process 200 can identify a context associated with the user at the time of making the request. The request can take the form of a user using an input device such as a keyboard, mouse or touch screen to indicate to a software program executing on a computing device that the user would like to select a file to open, for example. Aspects of disclosed implementations can also use gesture-sensitive devices or voice recognition to determine that a user would like to select a file.

Identifying the context may be performed by a software program or application that runs in the background as other computing tasks are performed on the computing device. The context identifying portion of process 200 can observe and record activities performed on the computing device in response to input from a user, for example running an application. The context forming application can observe and record any and all activities occurring on the computing device including user input, file access, program execution, network access including internet browsing and changes in the computing device environment including re-configuring hardware and software or other settings.

The context can be associated with a particular user of a computing device or can be associated with the computing device such that it is associated with any and all users of the computing device. On computing devices that require that users log on, the user associated with a context can be identified by identifying the user currently logged into the computing device. On computing systems that do not require an explicit login, a user can be identified by requesting that the user provide their identity to an application running on the computing device. Alternatively, computing devices equipped with video or audio input devices as described above can use automatic facial recognition software or automatic voice recognition software to identify a user. In other implementations, process 200 can update the context without requiring identification of a user, assuming that the context will apply to any user of a computing device and assigning a dummy user ID to the acquired context.

The context identified at step 202 can capture the current state of the computing device including files currently or recently being accessed, software programs currently or recently being executed, storage devices currently or recently being accessed or web sites currently or recently being visited, for example. In the case of files being accessed, the context can include information related to file names, file owners, file types, file size, creation dates, modification dates, last access date, whether the file is shared with other users, the location where the file is stored and information regarding the contents of the file. This information, particularly information regarding the file contents, can be automatically determined by content analysis software. In other implementations, a user can be prompted to enter some or all of the information by process 200.

In the case of software programs being executed, context information can include an identifier for the computing device currently being used by the user, the current time and date, information regarding the networks to which the computing device is in communication with, the physical location of the computing device and the user's identity. For example, a first context can include identifying a particular user as interacting with a first computing device, which can be a laptop computer located at a business location connected to a business network and the Internet, at 10:00 AM on a Monday morning. A second context can include identifying a particular user as interacting with a cell phone connected to a cellular telephone network and the Internet located on a highway at 5:30 PM on a weekday. A third context can include a particular user interacting with a tablet computer connected to the Internet at home at 9:00 PM on a weeknight.

These three examples show how even small amounts of context information can assist in locating files. For example, in the first example shown above, the context can establish that the user is at work and can be intending to open files related to work. The second example can establish that the user is using a mobile phone and likely driving in a car. Files desired by a user in this situation can relate to maps, appointments outside of work and shopping, for example. In the third example a user can be using a tablet computer at home and the desired files can relate to entertainment such as movies or TV shows, for example.

Context can also be identified by which software programs are currently executing on a computing device. This can include software programs such as operating systems, internet access applications such as web browsers, word processors, picture processing and archiving applications, e-mail applications, calendar applications, and social media applications. The context can include information regarding the data being handled by the applications including documents, images, e-mails, appointments, web sites visited and data received from social media software.

Context can also include information determined to be universally relevant to context regardless of the state of a particular software program. For example, although the calendar application may not currently be open on a particular computing device, the context for a user on that computing device at a particular time can include an upcoming scheduled meeting from the calendar database.

Context can also include information from an application currently being accessed by a user, updated in real time. For example, a user can be entering text into a file. While the user is entering text, the text may be analyzed to gather clues regarding what types of files might be requested by a user. In another example, a user can be surfing the Internet searching a particular topic. The search strings and contents of web pages may be analyzed to anticipate what files might be requested by the user. Context analysis software can be running in the background on a computing device on an ongoing basis, observing operational behavior and continuously updating the context based on the observations.

Context can also include information on past behavior. Context analysis software can track which files were opened by a user when running a particular program at a particular time. If a user is running the same programs on the same computing device at a similar time of day and opens a particular file, it can be assumed from the context that the user may desire to open other files that were also opened along with the particular file, for example.

It is worth noting that the information used in forming a context for a user or computing system is not designed to be accessed by any other computing device or entity that may be permanently or intermittently associated with the computing device. The context information is not shared or transmitted to any system for any purpose other than providing context for a specific user that is used to search for files, which may be located on storage associated with the computing device or on a network, which may include the Internet. The information that aspects of disclosed implementations exposes to systems outside of the computing device can be limited to information regarding which file or files to inspect to determine if they are relevant to a current file access. Thus, context information is not directly accessible by any other computing device.

Context information can be divided into different categories and made active for different periods of time. For example, it can be observed that a particular user or computing device accesses files associated with health and fitness during the entire year, while files associated with a particular sport are accessed mainly during the season the sport is active. File names for files associated with health and fitness can therefore be included in the list of relevant file names at any time of the year. File names for files associated with a particular sport can be included in the list of relevant file names only during and near the time the sport is in season.

The algorithm used to determine context can be heuristic, meaning that it can be based on a rule-driven algorithm with a list of rules that can be edited or modified either automatically based on experience or manually by editing existing rules or entering new rules. In this way the behavior of the algorithm that forms the context can evolve as it observes activities on the computing device or can be guided towards a particular behavior by editing the rules. Continuing the example started above, if a user decides that they no longer are fans of a particular sport, and the context forming algorithm continues to find file names of files associated with that particular sport, a file containing the heuristic rules to delete rules can be made editable to permit a user to delete references or rules related to that sport.

Context information can be used to suggest actions to a user in addition to file names. For example, possible e-mail recipients, calendar events or website addresses could be suggested to a user based on context information. Context can be analyzed by an automatic context analysis algorithm in real time with the results of the analysis combined with previously stored context information to suggest files, users, locations or events for a user to attach, contact, visit, view or attend. Context can be used to refer to information or objects residing on any computing device associated with a user including mobile or networked devices. For example, context for a user at a computing device can include information on photographs residing on a user's mobile phone, assuming the user has indicated that the contents of their mobile phone can be included in the context for that user.

Figure 3:
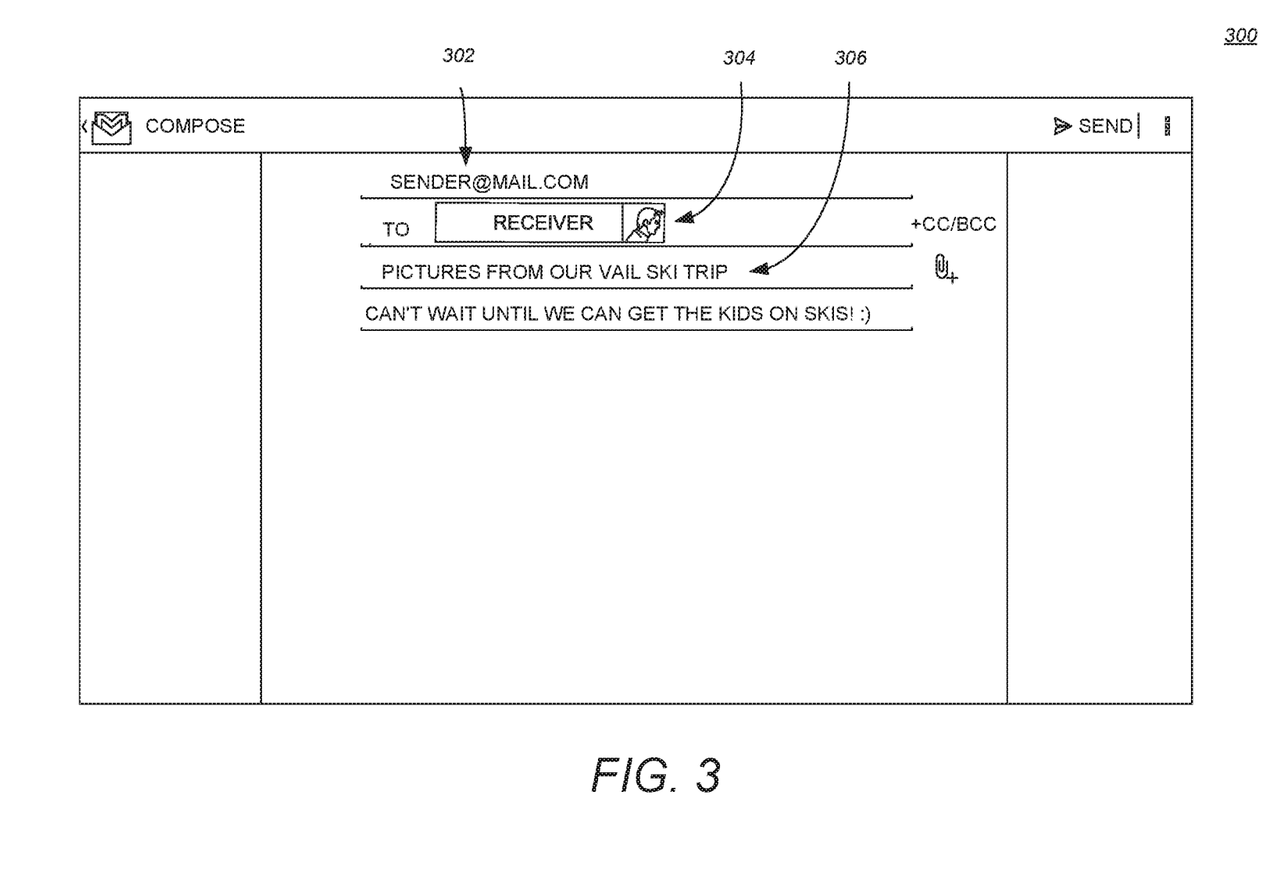
FIG. 3 is a diagram of user generated context according to an implementation of the teachings herein.

FIG. 3 is an example showing an e-mail message 300 being created by a user. Message 300 includes an e-mail address 302 of a sender, an e-mail address 304 of an intended recipient and a message body 306. Aspects of disclosed implementations can analyze this e-mail as it is being written to add information to the context file associated with a user of the computing device. For example, based on message 300, the context file can be updated to include the receiver's e-mail address, a previous vacation and a reference to a family member. Context developed from this information can include other previously stored information such as information regarding the receiver including network or system identification, file ownership or sharing and joint participation in past or future meetings from a related calendar program. Other e-mail messages to or from the intended recipient can be examined to determine if context information from those e-mails could also be used.

Context can also include information regarding the vacation mentioned in body 306 of message 300. By examining a calendar related to the user or computing device, it can be determined, for example, that the user scheduled a vacation to this location for certain dates in the recent past. By examining the user's communications with travel websites it could be determined which airlines, rental cars and hotels were used on which dates, thereby establishing an itinerary for the user. In addition, the context algorithm can observe that the word "pictures" was used in the e-mail message and by combining the itinerary information extracted above with date and geographic information associated with picture files determine which picture files accessible to the computing device are associated with this vacation, for example.

Figure 6:
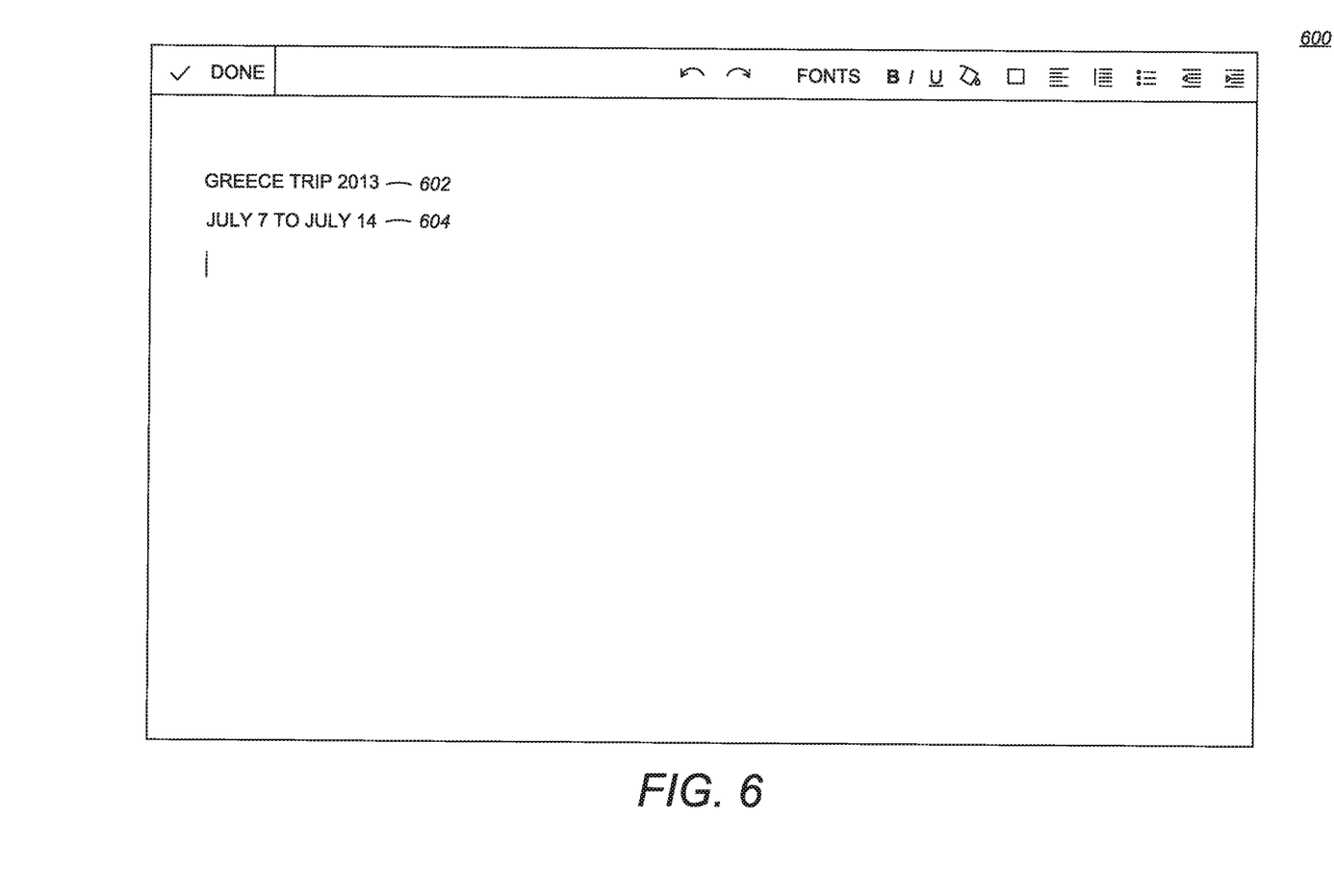
FIG. 6 is a diagram of user generated context according to an implementation of the teachings herein.

FIG. 6 is a diagram showing a document 600 being created by a user using a word processing application. Document 600 includes a title 602 and a date range 604. This information can be automatically extracted from document 600 as it is being typed and then be analyzed by process 200 for inclusion in the context. As in the example above, this information can be combined with other information available to the context algorithm to create a richer, more inclusive context. The dates can be correlated with a calendar and travel information as described above to establish that the user has taken a trip and determine, for example, whether the trip was a vacation or a business trip, whether a conference was included and whether the user delivered a paper at the conference. The context can be prepared to identify files related to this trip, whether they are vacation photos, new business contacts or a copy of slides presented at a conference, e.g., when the user seeks to access another file, such as an image file.

Returning to FIG. 2, process 200 identifies computer files associated with the context at step 204. This can occur responsive to a request to access a file or files from an application based on a user action or initiated by the application itself. For example, when opening a spreadsheet application, one of the first things the application does is present a dialog box to the user requesting a spreadsheet file to open. Applications can have a single default location to which the file open dialog defaults, or use the last location accessed. If the location of desired file is not at the default location a user would have to remember where the desired file was stored and navigate to that location to open a file.

According to the teachings herein, however, the dialog box may include a list of file names associated with a context at the time the request to open a file occurs. The context may include, for example, whether a particular spreadsheet is opened during the last week of one or more months. The context forming algorithm can have rules that recognize that particular reports are due at the end of the month and status reporting spreadsheets are normally worked on at this computing device during the last week of the month. As a result, a file name list can be formed that includes status reporting spreadsheets that have been opened during the last week of a month.

More generally, process 200 can use the current context information to form search strings. These search strings can be applied to a searchable file system that includes files accessible to the user. The search string can include information regarding files that results in a list of files relevant to the search string. Readily available searching technology can provide scores along with the file names and locating information so that the list of files can be sorted according to a "relevance" measure that measures how closely the file matches the search criteria. In this way, the files that are determined to be most relevant to the current context can be presented to the user.

File names to be included in a list to be presented to a user can be acquired by forming file access templates and returning all file names that match the criteria in the template. In the example above, the search may include all file names that start with the string "monthly status" and end in the file type extension ".xls" and have been opened during the last week of a month. File names can be identified by matching information contained in the file header such as name, creation date, creator name, or last modified date.

File names can also be identified by searching the contents of files and forming matches with rules in the context. Searching for text files by contents can be as simple as: "search for all files containing the word 'baseball'" or can be more complex, such as: "search for all files containing references to seasons of the year." In the latter case, a heuristic search strategy might include a list of words related to seasons and synonyms can be developed to assist in searching.

Files containing data that is not normally searchable can be searched by including keywords. For example, photographs can be identified by having a user add keywords to identify the photograph. Contents of files such as photographs can also be automatically processed to identify keywords to be associated with the image file. Software is currently available that analyzes photographs according to the contents and automatically identifies people (names) and places (for example, the Eiffel Tower). This type of information can be used to identify a photograph for the algorithm that selects files based on the context.

Other information can be used to identify files like photographs. For example, some smart phones include GPS units that can identify the latitude and longitude at which a photograph was taken. Combining this information with information from a geographic information system (GIS) can indicate in which country or state a photograph was taken, thereby providing further identification information for the photograph. Combining this information with the dates and further information regarding time off work can indicate that the photographs were taken on vacation to a particular location, for example.

Figure 4:
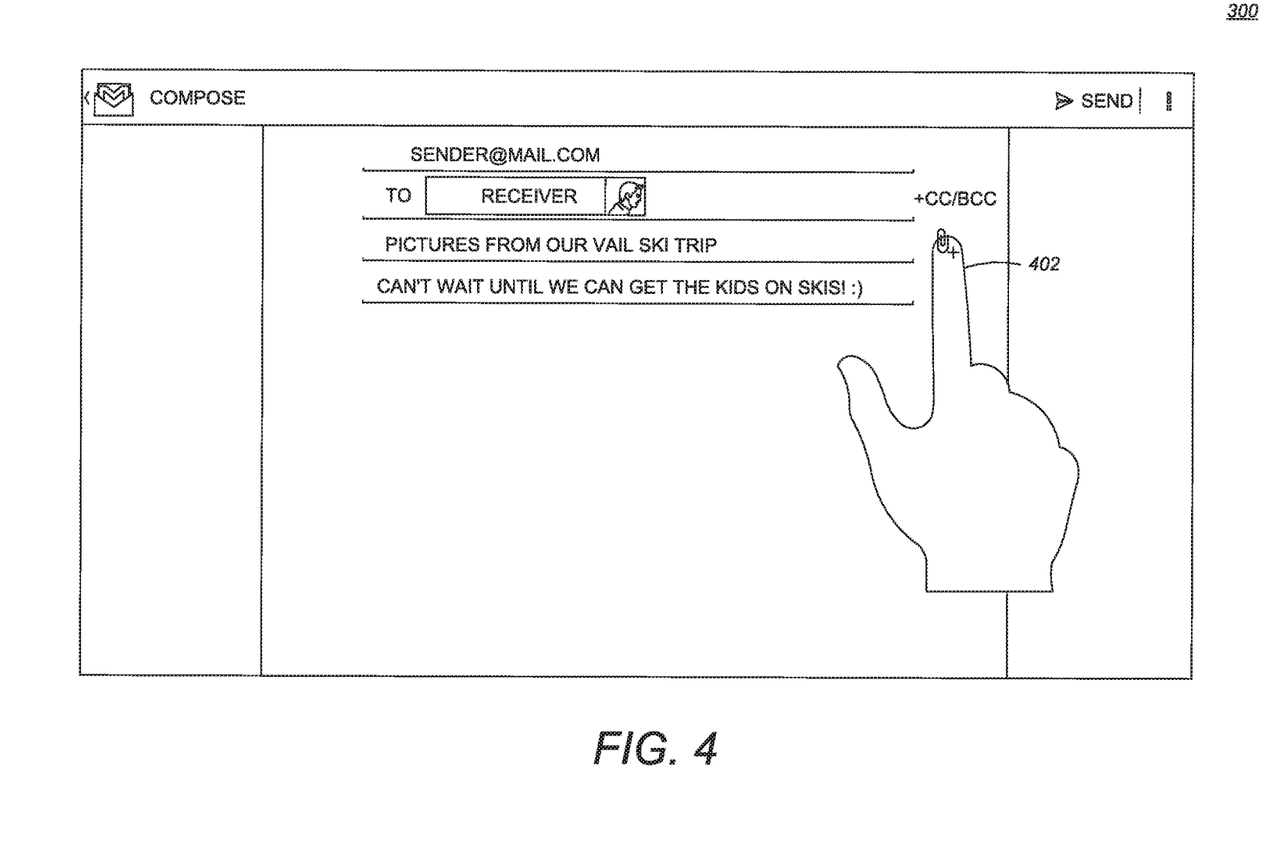
FIG. 4 is a diagram of a user generating a file access request according to an implementation of the teachings herein.

FIG. 4 shows a user selecting an "add attachment" icon 402 related to an e-mail message 300. Since, as described in relation to FIG. 3, the context algorithm has analyzed message body 306 and possibly combined it with other information from the system, process 200 is prepared to select file names associated with e-mail message 300 to present to the user in response to the request to add a file as an attachment. In this case, the attached can be files, particularly pictures, associated with a vacation to a particular location at a particular time.

Figure 7:
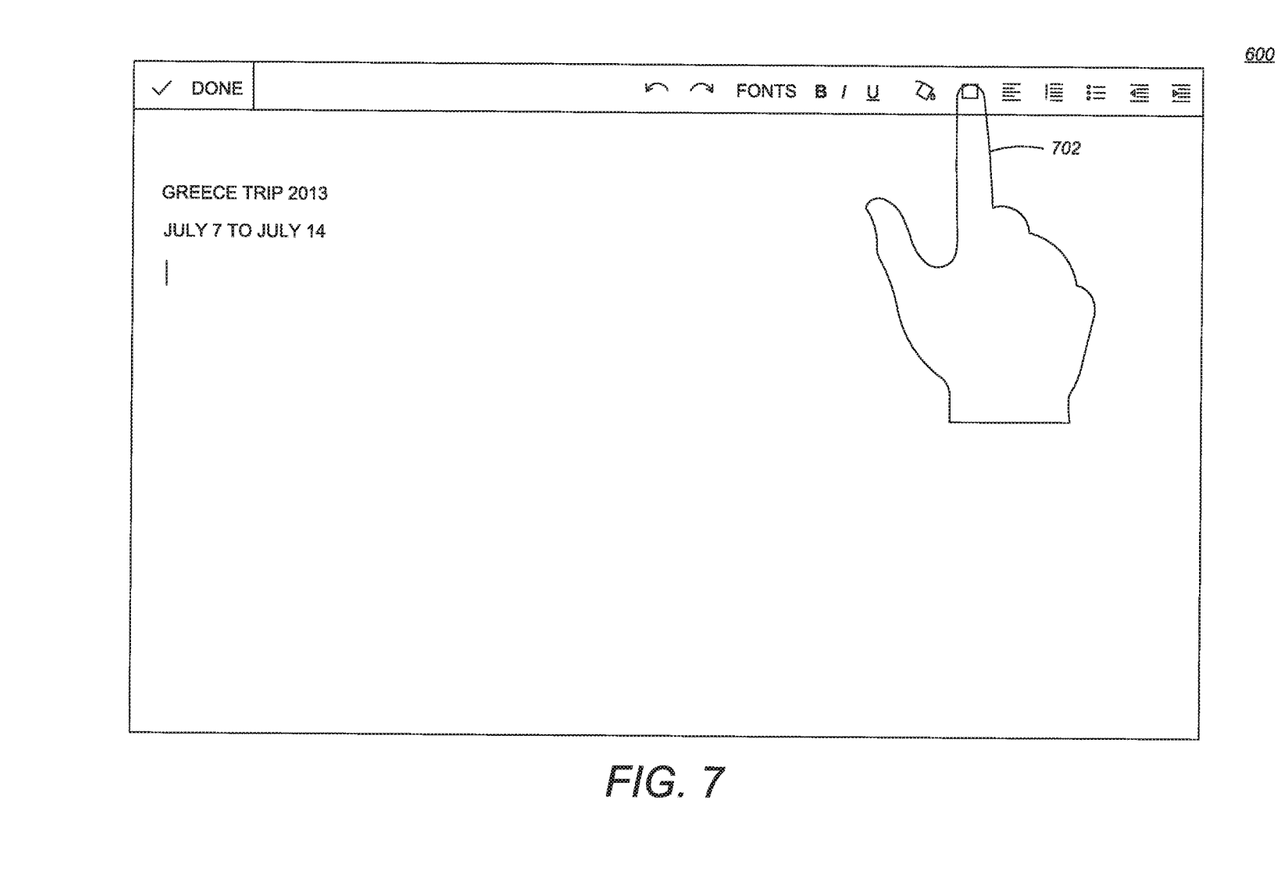
FIG. 7 is a diagram of a user generated file access request according to an implementation of the teachings herein.

FIG. 7 shows a user selecting an "insert image" or "add image" icon 702 associated with document 600 from FIG. 6. Since, as described in relation to FIG. 6, the context application has analyzed the contents 602, 604 of document 600 604, the context application can identify files containing images associated with the trip mentioned in the document when the user selects the insert image icon 702. Following the example begun above, if the trip were a vacation, they could be vacation photos. If the trip were a conference, the method of operation can identify file names associated with the conference, for example copies of slides presented at a meeting.

Returning again to FIG. 2, the information selected by the context application at step 204 can be displayed for a user at step 206. As discussed above, this can include file names for files determined by the context to be associated with the application currently accepting commands from a user, or other information included in the context. This other information can include suggested recipients for an e-mail message, suggested users with whom to share a document or photograph, data from social media sites, website addresses, favorite files and websites, e-mail messages or calendar entries, for example.

Figure 5:
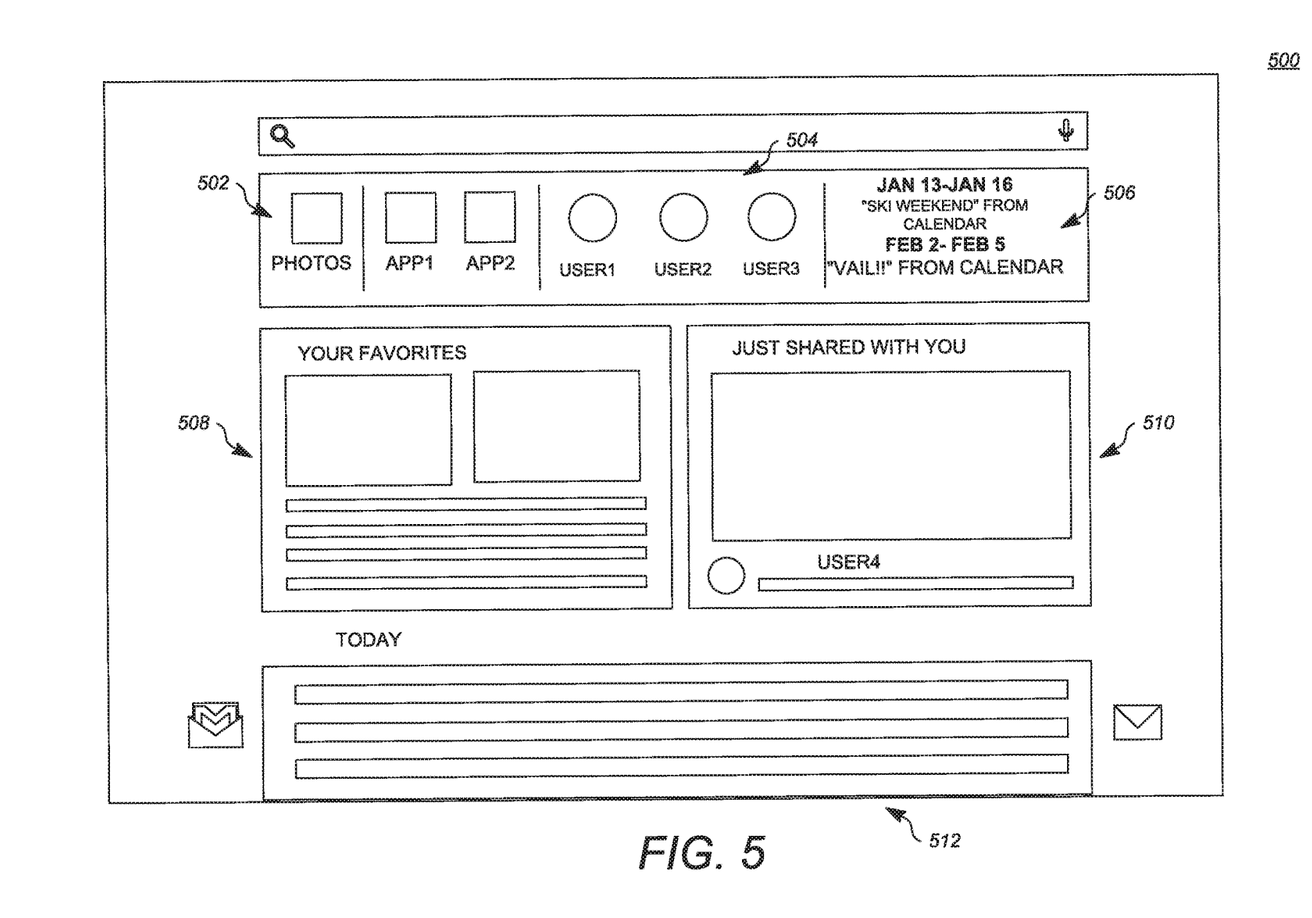
FIG. 5 is a diagram of a context-based file open dialog according to an implementation of the teachings herein.

FIG. 5 is an example of a dialog 500 associated with e-mail message 300 of FIG. 3. In response to a user selecting the "add attachment" icon 402 in FIG. 4, process 200 may display dialog 500 including lists 502, 504, 506, 508, 510 and 512. Dialog 500 includes a list 502 of links to photographs ("PHOTOS") and social media sites ("APP1", "APP2") selected by the context to apply to the current e-mail message. The links in list 502 at least partially match search strings formed by process 200 using the current context in response to the user requesting a file by selecting icon 402. Dialog 500 also includes a list 504 of suggested recipients for message 300 based on the analyzed contents and a list 506 of other context and calendar events related to message 300. List 504, for example, includes links to e-mail addresses ("USER1", "USER2" and "USER3") from a user's e-mail address book that process 200 has identified as having sent or received e-mails containing data that at least partially match the search strings formed by process 200. Similarly, list 506 may include events from a calendar program that at least partially match the search strings formed by process 200.

Dialog 500 can also include a list 508 with thumbnail images of "favorites" previously selected by the context application based on their frequency of access to be presented in dialog 500 regardless of the contents of related documents. Desirably, however, the files of list 508 at least partially match the search strings formed by process 200. List 508 may include reduced views of the contents of files to help a user quickly determine which file to open. List 508 may also include a list of file names to permit a user to select a file that has not had the contents displayed. This permits process 200 to display more files than if a thumbnail of the contents were displayed for all files identified. Match scores for the files with respect to the search strings can determine which files to show with a thumbnail of the contents and which files to display with only the file name.

The context application can also suggest and display a list 510 of related messages and other files including documents or events received, opened and/or scheduled during a particular time period 512, for example the current day. The items in list 510 at least in part match the search strings. Similarly to list 508, list 510 may include thumbnails of file contents ("Just shared with you") and lists of items that can include e-mail messages or contacts ("USER4"), files or events, for example. In this example, list 510 includes recent files that have been recently accessed by the user ("TODAY").

Figure 8:
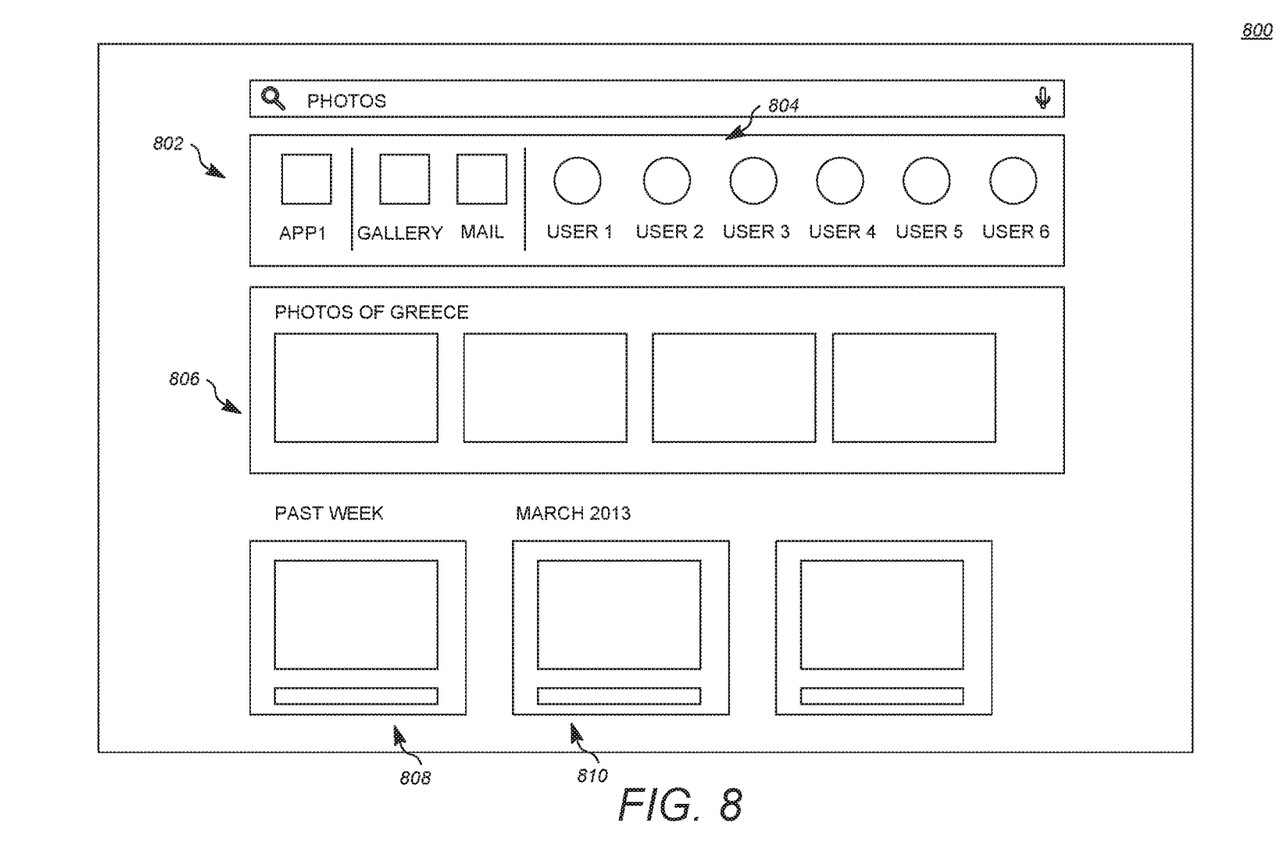
FIG. 8 is a diagram of a context-based file open dialog according to an implementation of the teachings herein.

FIG. 8 is an example of a dialog 800 associated with document 600 of FIG. 6. Dialog 800 was formed in response to the selection by the user of icon 702 of FIG. 7 while editing document 600. Process 200 has determined from the context that the files the user desires to open include image files; hence the heading "Photos" shown for dialog 800. Items displayed in dialog 800 can include a list 802 of links to files including applications and websites addresses including a social media site ("APP1"), photo websites such as a picture archiving application ("GALLERY") and e-mail message, all of which include image files related to the search strings formed by process 200.

Also displayed is a list 804 of e-mail addresses ("USER1", "USER2", "USER3", "USER4", "USER5" and "USER6") from a user's e-mail address book that process 200 has identified as having sent or received e-mails that include data that at least partially matches the search strings formed by process 200. These addresses may be links to a list of documents associated with each address that are found by process 200. List 806 of files including image files that process 200 has identified as being related to the context formed from document 600 are included in dialog 800. List 806 may include thumbnails residing on storage devices accessible by the user that at least in part match the search string formed by process 200 in response to the user requesting a file. Also included in dialog 800 are lists 808, 810 of additional file names of files that have been identified by process 200 as being related to the context formed from document 600 arranged in groups according to dates upon which they were acquired. List 808 includes a list of items shared with the user in the past week ("PAST WEEK"), and list 810 includes a list of items shares with the user during a specific past time period ("MARCH 2013") that at least in part match the search strings. Lists 808, 810 can include thumbnails of files.

Returning to FIG. 2, one of the particular advantages resulting from the teachings herein is speed. Providing a selected set of file names based on context can permit a user to locate and open a file more quickly than using a standard file open dialog that requires that one navigate to a location and filter results. Process 200 can identify and list files regarded as relevant to the user and the task identified by the context, thereby reducing the number of irrelevant data items presented to a user.

In operation, in the event that a dialog presented by process 200 does not include any files that are deemed relevant by the user, the user can select an option, such as through a button or other display item, to return to a standard or default file open dialog and permit the user to identify, locate and open a file using that file open dialog. In FIG. 5, for example, a search box is included by which a user may enter a command such as "default" to generate the file open dialog.

Items in addition to files can be presented to the user as a result of generating a list of stored files to a user. For example, links to social media sites associated with a user can be searched for content that matches the search strings compiled by process 200. E-mail address books can be searched for e-mail addresses that have provided content that matches the search string and calendars can be searched for appointments or meetings associated with the search strings compiled by process 200. In addition, recently visited web sites or storage locations can be listed along with recently shared files, e-mails, appointments or web sites from other users. Following presentation of the list of lists of files, addresses and websites to a user, process 200 permits a user to select a file, address or website to navigate to.

The list of stored files generated at step 206 can be displayed to a user to permit the user to select a file to open or include as an attachment to an e-mail or calendar event, for example. Presenting a list of stored files generated in this fashion can permit a user to find a desired file more quickly with less work than using a standard file open dialog. In addition, providers of software and services such as search or social media are increasingly gathering more and more information regarding online behavior. This information may be used by process 200 to identify patterns of behavior that can be used to find files appropriate to a user's request to open files.

In situations in which the systems discussed here collect personal information about users, or may make use of personal information, the users may be provided with an opportunity to control whether programs or features collect user information (e.g., information about a user's social network, social actions or activities, profession, a user's preferences or a user's current location), or to control whether and/or how to receive content from the content server that may be more relevant to the user. In addition, certain data may be treated in one or more ways before it is stored or used so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and is used by a content server.

Using the teachings herein, the most appropriate suggestions for accessing a file, such as opening a file or attaching a file within an existing application process, may be presented to a user at the time the request is made. The teachings may be implemented in a 100% heuristic-based algorithm to improve searches over time. By using the teachings herein, users can spend less time picking files and more time with task-related activity such as performing operations and the like using the files.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of computing device 100 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

Further, in one aspect, for example, computing device 100 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

All or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method implemented by a processor in response to instructions stored on a non-transitory computer readable medium, the method comprising:
   receiving a file access request message indicating a request to select one or more files for a user;
   receiving a set of editable rules provided by the user, the set of editable rules to be used to identify file request context information;
   in response to receiving the file access request message, identifying file request context information associated with the request, wherein the file request context information is unavailable to external systems, and wherein the file request context information is based at least in part on a plurality of applications currently executing on a user device of the user and the set of editable rules provided by the user;
   identifying one or more candidate files based on the file request context information;
   identifying one or more candidate user contacts of the user based on the file request context information, each of the one or more candidate user contacts having sent communications to or received communications from the user, wherein the communications include at least one of the one or more candidate files;
   generating a display portion of a user interface for selecting the one or more files and for selecting the one or more candidate user contacts, the display portion including a representation of at least one of the one or more candidate files and a representation of at least one of the one or more candidate user contacts, wherein the representation of at least one of the one or more candidate user contacts comprises a link to the identified one or more candidate files; and
   outputting the display portion for display to a user.

2. The method of claim 1, wherein the file access request message omits a file identifier identifying the one or more files.

3. The method of claim 1, wherein the file request context information includes a file name, a file owner, a file type, a file size, a file creation date, a file modification date, a file access date, a status of a file as being shared, a file location, or a file content.

4. The method of claim 1, wherein:
receiving the file access request message includes receiving the file access request message from an external user device; and
the file request context information includes information indicating the external user device.

5. The method of claim 4, wherein outputting the display portion includes transmitting information representing the display portion to the external user device.

6. The method of claim 1, wherein identifying the candidate files includes: forming a search string using the file request context information; and searching using the search string.

7. The method of claim 1, wherein identifying the candidate files includes: identifying previously stored context information associated with a file; and including the file in the candidate files in response to a relevance determination base on the previously stored context information and the file request context information.

8. A computing device, comprising:
a non-transitory computer readable medium; and
a processor configured to execute instructions stored on the non-transitory computer readable medium to:
receive a file access request message indicating a request to select one or more files for a user;
receive a set of editable rules provided by the user, the set of editable rules to be used to identify file request context information;
in response to receiving the file access request message, identify file request context information associated with the request, wherein the file request context information is unavailable to external systems, and wherein the file request context information is based at least in part on a plurality of applications currently executing on a user device of the user and the set of editable rules provided by the user;
identify one or more candidate files based on the file request context information;
identify one or more candidate user contacts of the user based on the file request context information, each of the one or more candidate user contacts having sent communications to or received communications from the user, wherein the communications include at least one of the one or more candidate files;
generate a display portion of a user interface for selecting the one or more files and for selecting the one or more candidate user contacts, the display portion including a representation of at least one of the one or more candidate files and a representation of at least one of the one or more candidate user contacts, wherein the representation of at least one of the one or more candidate user contacts comprises a link to the identified one or more candidate files; and
output the display portion for display to a user.

9. The computing device of claim 8, wherein the file access request message omits a file identifier identifying the one or more files.

10. The computing device of claim 8, wherein the file request context information includes a file name, a file owner, a file type, a file size, a file creation date, a file modification date, a file access date, a status of a file as being shared, a file location, or a file content.

11. The computing device of claim 8, wherein the file request context information includes information indicating an external user device, and wherein the processor is configured to receive the file access request message from the external user device.

12. The computing device of claim 11, wherein the processor is configured to output the display portion by transmitting information representing the display portion to the external user device.

13. The computing device of claim 8, wherein the processor is configured to identify the candidate files by:
forming a search string using the file request context information; and searching using the search string.

14. The computing device of claim 8, wherein the processor is configured to identify the candidate files by:
identifying previously stored context information associated with a file; and including the file in the candidate files in response to a relevance determination base on the previously stored context information and the file request context information.

15. A non-transitory computer-readable storage medium, comprising executable instructions that, when executed by a processor, facilitate performance of operations, comprising:
receiving a file access request message indicating a request to select one or more files for a user;
receiving a set of editable rules provided by the user, the set of editable rules to be used to identify the file request context information;
in response to receiving the file access request message, identifying file request context information associated with the request, wherein the file request context information is unavailable to external systems, and wherein the file request context information is based at least in part on a plurality of applications currently executing on a user device of the user and the set of editable rules provided by the user;
identifying one or more candidate files based on the file request context information;
identifying one or more candidate user contacts of the user based on the file request context information, each of the one or more candidate user contacts having sent communications to or received communications from the user, wherein the communications includes at least one of the one or more candidate files;
generating a display portion of a user interface for selecting the one or more files and for selecting the one or more candidate user contacts, the display portion including a representation of at least one of the one or more candidate files and a representation of at least one of the one or more candidate user contacts, wherein the representation of at least one of the one or more candidate user contacts comprises a link to the identified one or more candidate files; and
outputting the display portion for display to a user.

16. The non-transitory computer-readable storage medium of claim 15, wherein the file access request message omits a file identifier identifying the one or more files.

17. The non-transitory computer-readable storage medium of claim 15, wherein the file request context information includes a file name, a file owner, a file type, a file size, a file creation date, a file modification date, a file access date, a status of a file as being shared, a file location, or a file content.

18. The non-transitory computer-readable storage medium of claim 15, wherein:
- receiving the file access request message includes receiving the file access request message from an external user device;
- the file request context information includes information indicating the external user device; and
- outputting the display portion includes transmitting information representing the display portion to the external user device.

19. The non-transitory computer-readable storage medium of claim 15, wherein identifying the candidate files includes:
- forming a search string using the file request context information; and searching using the search string.

20. The non-transitory computer-readable storage medium of claim 15, wherein identifying the candidate files includes:
- identifying previously stored context information associated with a file; and including the file in the candidate files in response to a relevance determination base on the previously stored context information and the file request context information.

\* \* \* \* \*